United States Patent
Matsui

(10) Patent No.: US 8,724,172 B2
(45) Date of Patent: May 13, 2014

(54) IMAGE PROCESSING APPARATUS, IMAGE PROCESSING METHOD, AND STORAGE MEDIUM CAPABLE OF REALIZING HIGH SPEED GENERATION PROCESSING OF BITMAP IMAGE DATA WITHOUT INCREASING THE LOAD OF OBJECT COMBINING PROCESSING

(75) Inventor: Kenta Matsui, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 13/586,248

(22) Filed: Aug. 15, 2012

(65) Prior Publication Data

US 2013/0044336 A1 Feb. 21, 2013

(30) Foreign Application Priority Data

Aug. 19, 2011 (JP) ................... 2011-179743

(51) Int. Cl.
*G06F 15/00* (2006.01)
*H04N 1/403* (2006.01)
*G06K 15/00* (2006.01)
*H04N 1/405* (2006.01)
*H04N 1/387* (2006.01)

(52) U.S. Cl.
USPC ......... 358/1.9; 358/2.99; 358/3.11; 358/3.27; 358/450

(58) Field of Classification Search
USPC ........ 358/1.15, 1.9, 1.13, 1.1, 3.27, 3.11, 3.1, 358/3.12, 450, 448, 401, 452, 1.2, 1.6, 2.99, 358/3.01, 3.02, 1.18, 501, 505, 528, 537, 358/538, 540; 345/619, 629, 501, 418, 625, 345/630, 635, 638, 641, 672, 472
See application file for complete search history.

(56) References Cited

U.S. PATENT DOCUMENTS

| | | | |
|---|---|---|---|
| 2005/0200867 A1* | 9/2005 | Faggion | 358/1.9 |
| 2006/0008114 A1* | 1/2006 | Sekiguchi et al. | 382/100 |
| 2007/0070088 A1* | 3/2007 | Oishi | 345/629 |

FOREIGN PATENT DOCUMENTS

JP    2006-140597 A    6/2006

OTHER PUBLICATIONS

Okijoji, Device and Method for Printing Control Computer Program and Storage Medium, Jan. 6, 2006, Machine Translated Japanese Patent Application, JP2006140597, all pages.*

* cited by examiner

*Primary Examiner* — Ngon Nguyen
(74) *Attorney, Agent, or Firm* — Canon USA Inc. IP Division

(57) ABSTRACT

An image processing apparatus including at least one processor that executes a program, includes an analysis unit configured to analyze a print job, an optimization unit configured to, based on a result of the analysis performed by the analysis unit, combine a plurality of objects included in the print job into one object according to an upper limit number, which is different according to a type of the objects to be combined, an intermediate data generation unit configured to generate intermediate data based on the objects combined by the optimization unit, and an image data generation unit configured to generate image data from the intermediate data generated by the intermediate data generation unit.

9 Claims, 12 Drawing Sheets

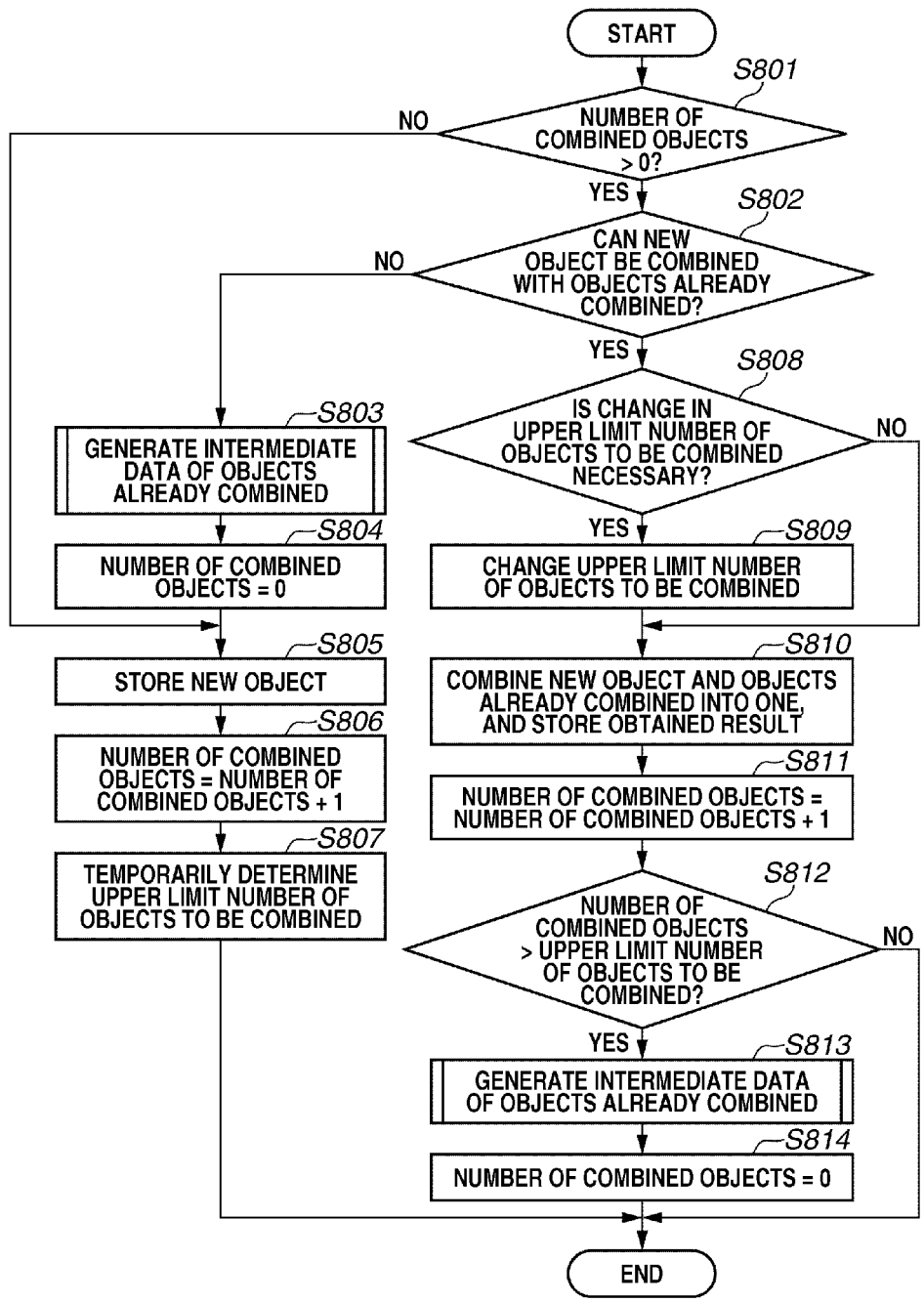

| 1101 | 1102 |
|---|---|
| CATEGORY 1 | 250 |
| CATEGORY 2 | 200 |
| CATEGORY 3 | 160 |
| CATEGORY 4 | 140 |
| CATEGORY 5 | 120 |

IMAGE PROCESSING APPARATUS, IMAGE PROCESSING METHOD, AND STORAGE MEDIUM CAPABLE OF REALIZING HIGH SPEED GENERATION PROCESSING OF BITMAP IMAGE DATA WITHOUT INCREASING THE LOAD OF OBJECT COMBINING PROCESSING

BACKGROUND OF THE INVENTION

1. Field of the Invention

The present invention relates to an image processing apparatus, an image processing method, and a storage medium.

2. Description of the Related Art

As a method for generating bitmap image data from a print job, Japanese Patent Application Laid-Open No. 2006-140597 discusses a scanline algorithm. FIG. 1 illustrates a concept of the scanline algorithm. In the following descriptions, a case where bitmap image data 301 is generated from a print job 300 including a rectangular graphic object 300a and a T-shaped graphic object 300b will be described.

According to the scanline algorithm, information of the object included in the print job 300 is calculated. The information contains "edge" 302, which indicates both ends of the object, "level" 303, which indicates an overlapping area, and "fill" 304, which indicates the color of the object. For example, left and right edges 302a and 302b, level 303a, and fill 304a are calculated from the rectangular graphic object 300a. The obtained values are linked to one another and stored. Similarly, left and right edges 302c and 302d, level 303b, and fill 304b are calculated from the T-shaped graphic object 300b. These values are also linked to one another and stored. To generate a bitmap image data, pixels between the left and the right edges are rendered using the "fill" pixels linked to the "edge".

Regarding a portion where objects overlap, a bitmap image is rendered using the "fill" pixels linked to the "edge" of a higher "level". Thus, only the pixels of the uppermost object are rendered on a frame buffer 305 in the generation of the bitmap image data. Accordingly, compared to a painter's algorithm, which renders all pixels of all objects on a frame buffer 401 illustrated in FIG. 2, bitmap image data can be generated more speedily by using the scanline algorithm.

There are various software applications which can be used to generate a print job. Some software applications issue redundant rendering instructions. For example, some software applications use a plurality of overlapping objects in forming one line. In such a case, a print job including continuously-arranged small objects will be generated.

FIG. 3 illustrates a case where one line is formed by one graphic object and a case where one line is formed by a plurality of graphic objects in a redundant manner. If one line is formed by one graphic object 500, the number of the edges is two (edges 500a and 500b). On the other hand, if one line is formed by a plurality of objects 501, 502, 503, 504, and 505, which are of the same configuration of a graphic object 506 and are arranged in a partially overlapping manner, the number of the edges increases since the objects 501 to 505 include edges (501a, 501b) to (505a, 505b), respectively.

Further, if data generated by a software application is used by a different software application, one object may be divided into a plurality of objects. In this case, a print job including continuously-arranged small objects will also be generated. FIG. 4 illustrates an example of one bitmap image divided into a plurality of bitmap images. The number of the edges of a bitmap image 600 is two (edges 600a and 600b). On the other hand, if the bitmap image 600 is divided into a plurality of images (bitmap images 601), the number of the edges (edges 602) increases according to the number into which the bitmap image 600 has been divided.

Regarding a print job including such continuously-arranged small objects, rendering objects of more than one million for one page is not uncommon. Thus, the number of the edges will be an enormous number.

If the scanline algorithm, which calculates edges and levels, is used in the generation of bitmap image data for a print job that includes large quantities of continuously-arranged small objects, the processing load of the edges and the levels will be very heavy. Such load can be reduced by introducing optimization processing that combines small objects into one object. According to the optimization processing, since the number of the edges and the levels is reduced, the processing load can also be reduced. Thus, high-speed generation processing of the bitmap image data can be realized. However, if the objects are simply combined without consideration, the load of the combining processing thereof will increase. Then, the high-speed generation processing of the bitmap image data is not realized.

SUMMARY OF THE INVENTION

The present invention is directed to an image processing apparatus capable of realizing high-speed generation processing of bitmap image data without increasing the load of object combining processing.

According to an aspect of the present invention, an image processing apparatus including at least one processor that executes a program includes an analysis unit configured to analyze a print job, an optimization unit configured to, based on a result of the analysis performed by the analysis unit, combine a plurality of objects included in the print job into one object according to an upper limit number, which is different according to a type of the objects to be combined, an intermediate data generation unit configured to generate intermediate data based on the objects combined by the optimization unit, and an image data generation unit configured to generate image data from the intermediate data generated by the intermediate data generation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 is a flowchart illustrating object combining processing.

DESCRIPTION OF THE EMBODIMENTS

Various exemplary embodiments, features, and aspects of the invention will be described in detail below with reference to the drawings.

Figure 1:
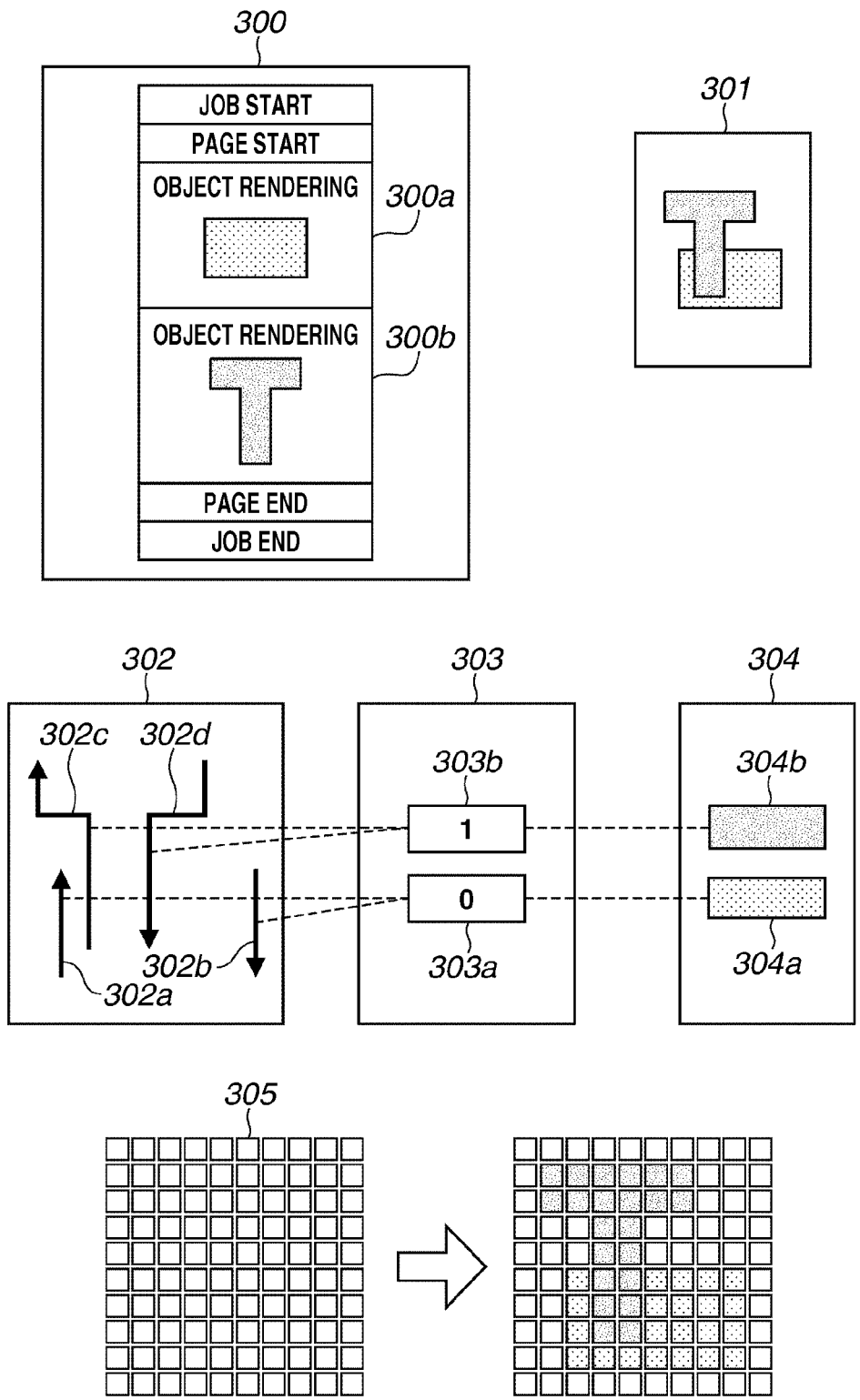
FIG. 1 illustrates a concept of a scanline algorithm.
Figure 2:
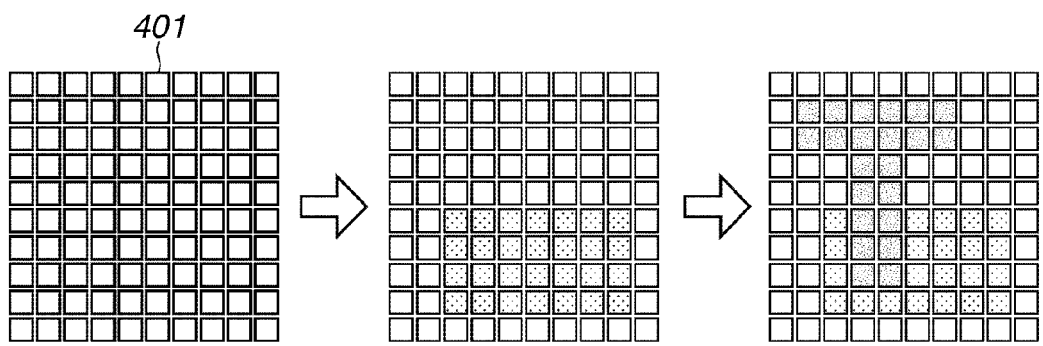
FIG. 2 illustrates a concept of a painter's algorithm.
Figure 3:
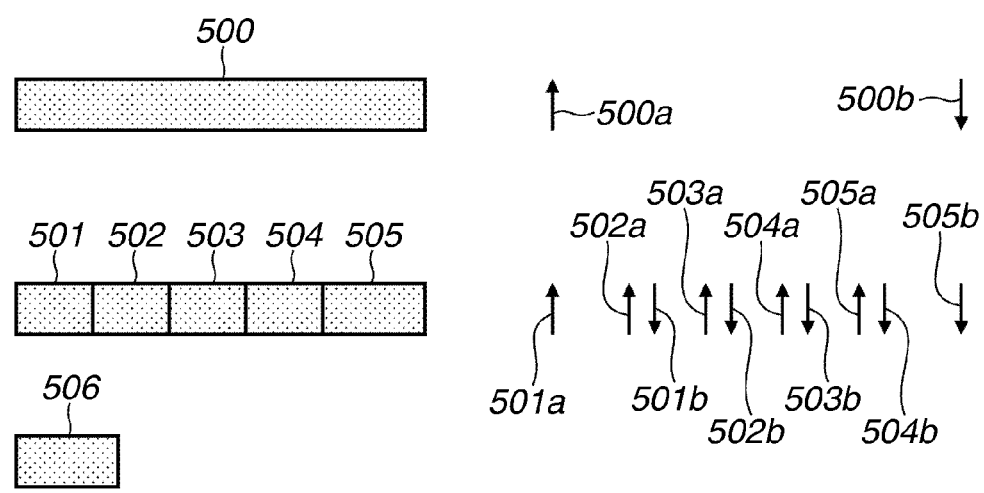
FIG. 3 illustrates one line formed by one object and by a plurality of objects.
Figure 4:
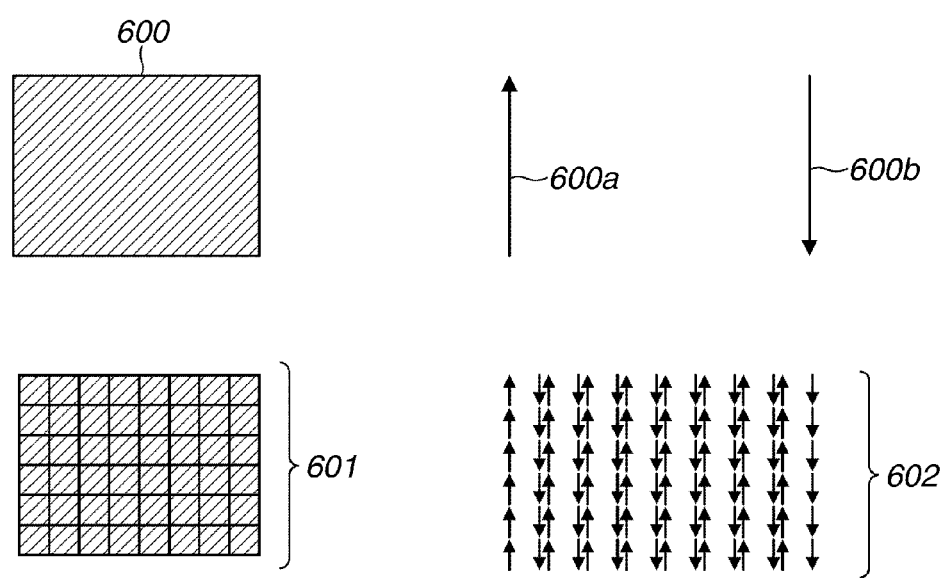
FIG. 4 illustrates a bitmap image and divided bitmap images.
Figure 5:
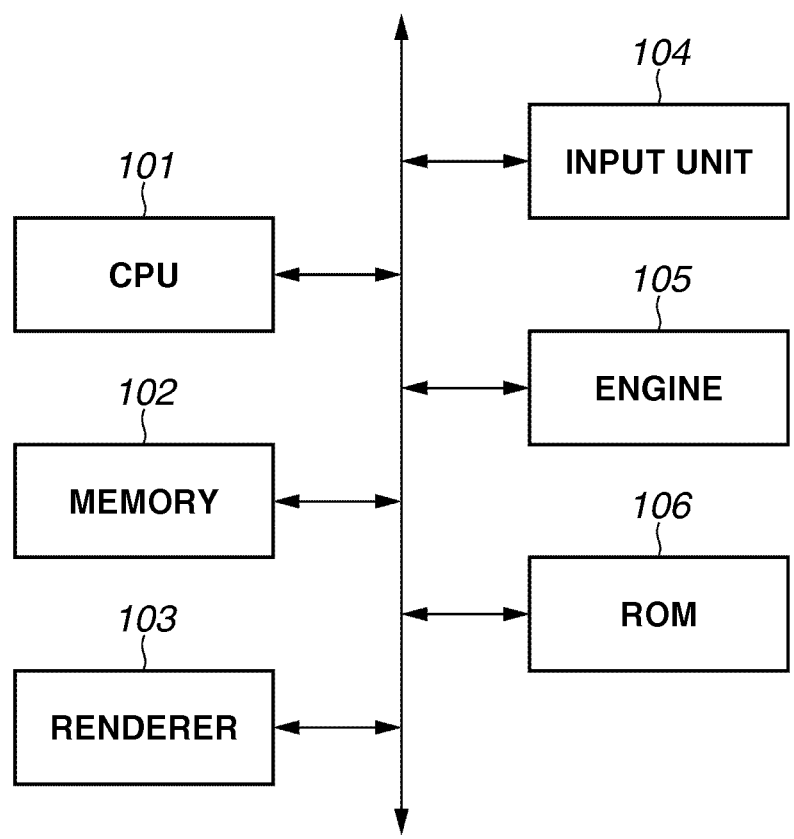
FIG. 5 illustrates an example of a hardware configuration of a printing apparatus according to an exemplary embodiment of the present invention.

FIG. 5 illustrates an example of a hardware configuration of a printing apparatus according to an exemplary embodiment of the present invention.

A central processing unit (CPU) 101 controls the printing apparatus. Further, all the software modules described below with reference to FIG. 6 run on the CPU 101.

A memory 102 is a random access memory (RAM) which can be accessed by the CPU 101. The memory 102 is used as a memory necessary in the operation of various types of software. The memory 102 is also used for storing intermediate data generated by an intermediate data generation unit 203 described below and bitmap image data generated by a renderer 103.

The renderer 103 is a hardware renderer that generates the bitmap image data using the scanline algorithm. An input unit 104 receives a print job input in the printing apparatus. An engine 105 prints an image on a sheet based on the bitmap image data generated by the renderer 103.

Figure 6:
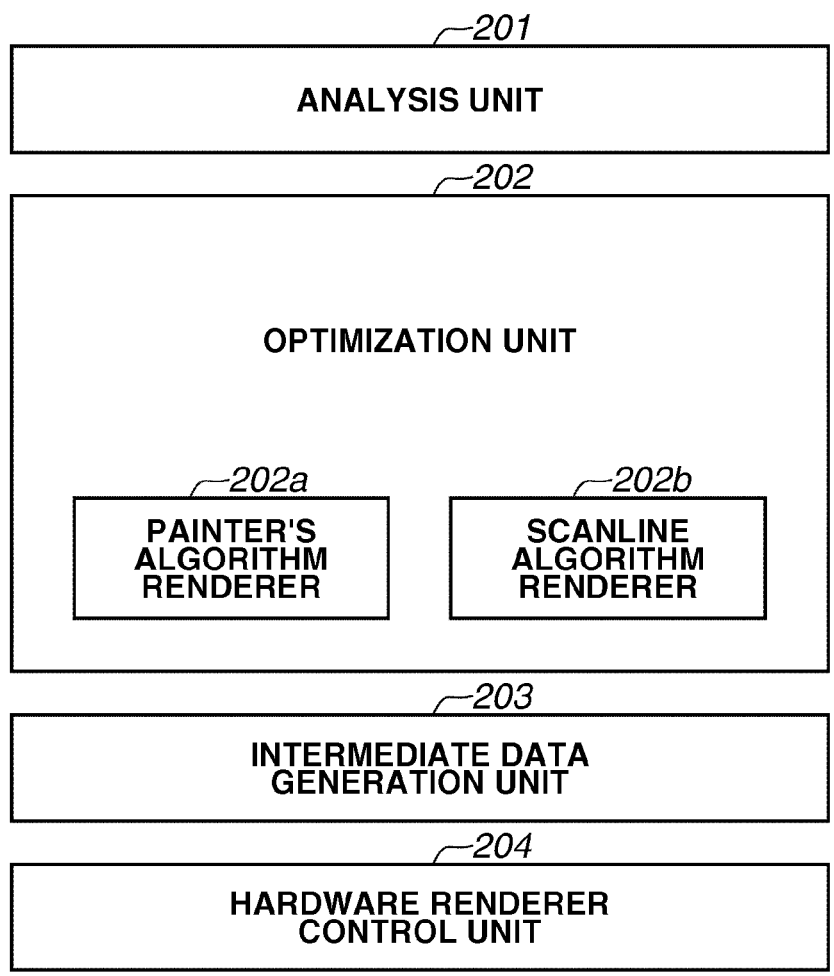
FIG. 6 illustrates an example of a software configuration of the printing apparatus.

A read-only memory (ROM) 106 is where programs of the software modules described below with reference to FIG. 6 are stored. From the ROM 106, the CPU 101 reads and executes the programs. The printing apparatus is an example of an image processing apparatus.

FIG. 6 illustrates an example of a software configuration of the printing apparatus. As described above, all the software modules run on the CPU 101.

An analysis unit 201 is a module that analyzes an object included in a print job received by an input unit 104.

An optimization unit 202 is a module that combines a plurality of objects, which can be combined, into one object according to an analysis result of the analysis unit 201. The optimization unit 202 includes a painter's algorithm renderer 202a and a scanline algorithm renderer 202b. The painter's algorithm renderer 202a is a software renderer that uses the painter's algorithm. The scanline algorithm renderer 202b is a software renderer that uses the painter's algorithm. The painter's algorithm software renderer 202a and the scanline algorithm renderer 202b are examples of a bitmap generation unit.

The intermediate data generation unit 203 is a module that generates intermediate data appropriate for the processing performed by the renderer 103. The intermediate data is generated from the object analyzed by the analysis unit 201 or the objects combined by the optimization unit 202.

A hardware renderer control unit 204 is a module that controls a series of processing procedures. The processing procedures include processing from the input of the intermediate data generated by the intermediate data generation unit 203 into the renderer 103, to the output of the bitmap image data in the memory 102. The hardware renderer control unit 204 is an example of an image data generation unit.

Figure 7:
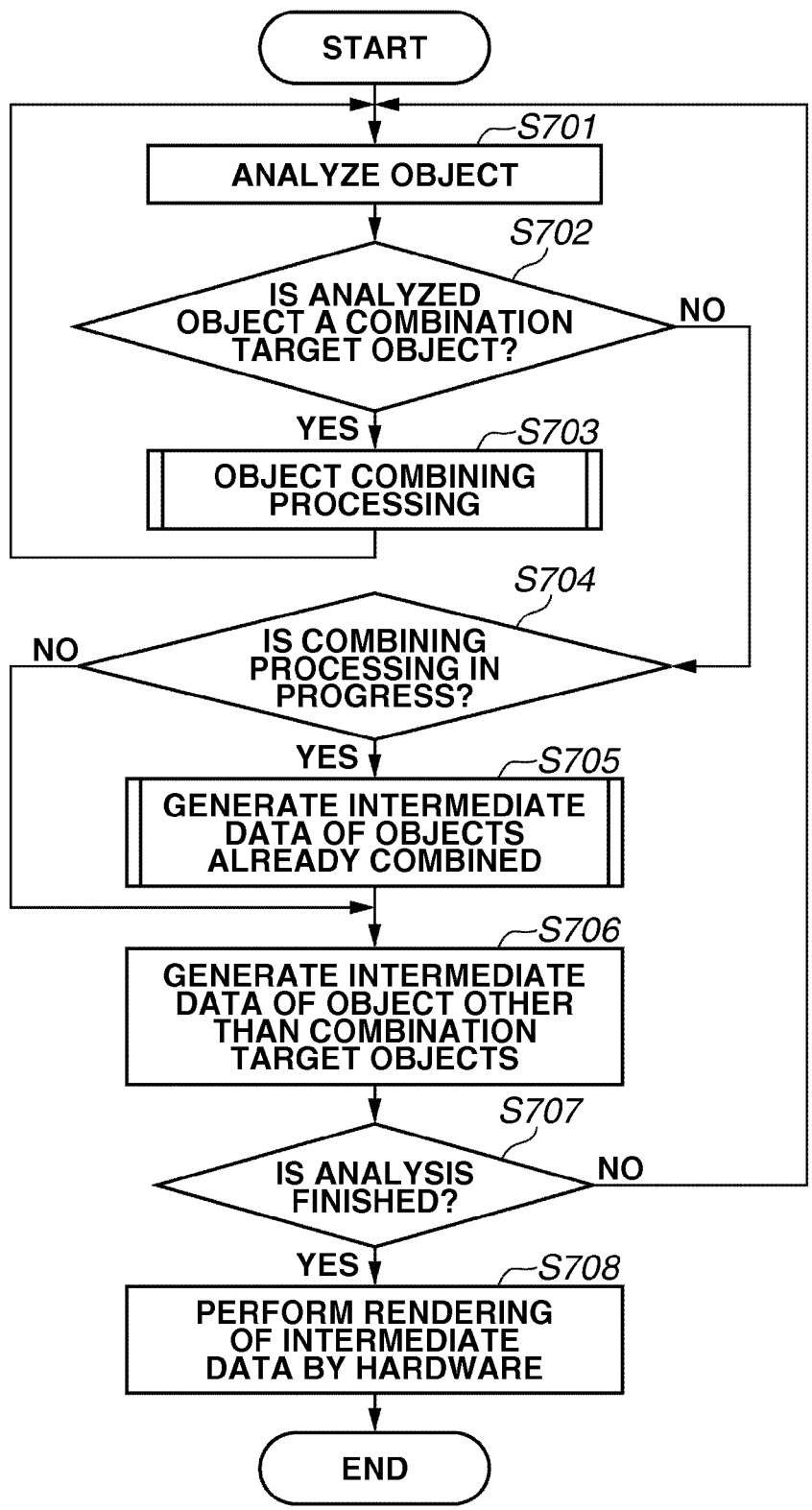
FIG. 7 is a flowchart illustrating generation processing of bitmap image data from a print job.

FIG. 7 is a flowchart illustrating an example of reading a print job and generating bitmap image data for each page.

In step S701, the analysis unit 201 reads a print job input in the input unit 104 and analyzes each object included in each page of the print job.

In step S702, the optimization unit 202 determines whether the analyzed object is an object to be combined. According to the present embodiment, the following object is continuously regarded as an object to be combined.

FIGS. 8A, 8B, 8C, 8D, and 8E illustrate examples of the objects to be combined and the result obtained from the combining processing.

Figure 8A:
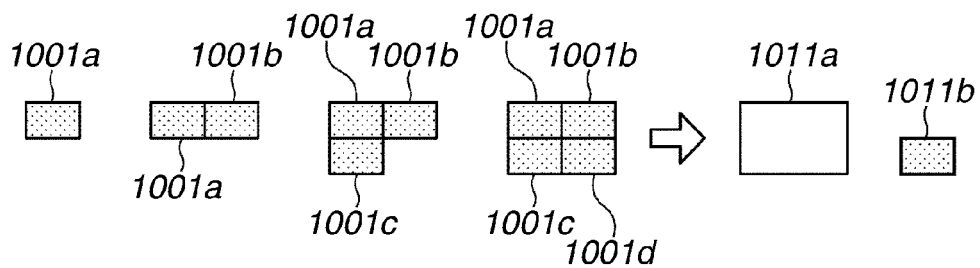
FIGS. 8A, 8B, 8C, 8D, and 8E illustrate examples of objects as combining targets, and combination methods.

FIG. 8A illustrates an example of rectangular graphic objects of the same color and with no overlapping areas. In FIG. 8A, rectangular graphic objects 1001a, 1001b, 1001c, and 1001d are continuously rendered in order. These objects have the same color and do not have an overlapping area. Such continuously arranged objects can be combined into one object having one path 1011a, which indicates an outline of the combined object, and a color value 1011b.

Figure 8B:
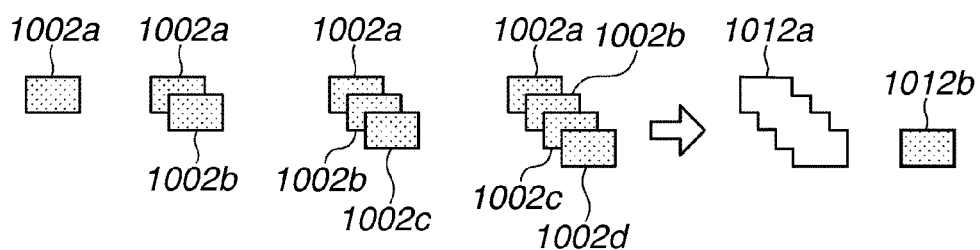

FIG. 8B illustrates an example of rectangular graphic objects of the same color and with overlapping areas. In FIG. 8B, rectangular graphic objects 1002a, 1002b, 1002c, and 1002d are continuously rendered in order. These objects have the same color and have overlapping areas. Such continuously arranged objects can be combined into one object having one path 1012a, which indicates an outline of the combined object, and a color value 1012b.

Figure 8C:
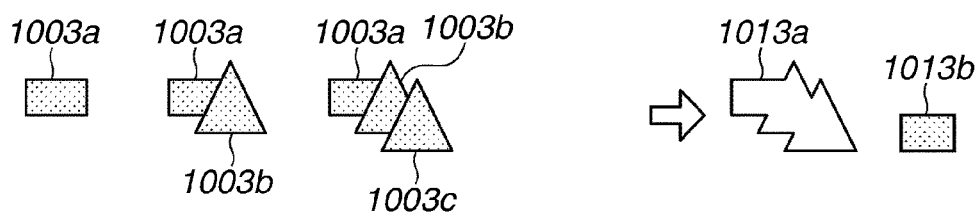

FIG. 8C illustrates an example of graphic objects of arbitrary shapes and of the same color. In FIG. 8C, graphic objects 1003a, 1003b, and 1003c having arbitrary shapes and with the same color are continuously rendered in order. Such continuously arranged objects can be combined into one object having one path 1013a, which indicates an outline of the combined object, and a color value 1013b.

Figure 8D:
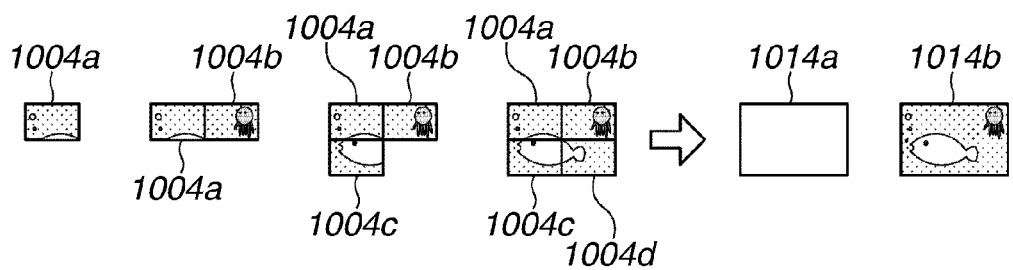

FIG. 8D illustrates an example of image objects with no overlapping areas. In FIG. 8D, rectangular graphic objects 1004a, 1004b, 1004c, and 1004d are continuously rendered in order. They do not have an overlapping area. Such continuously arranged objects can be combined into one image 1014b including all the objects and a path 1014a which indicates an outline of the combined object.

Figure 8E:
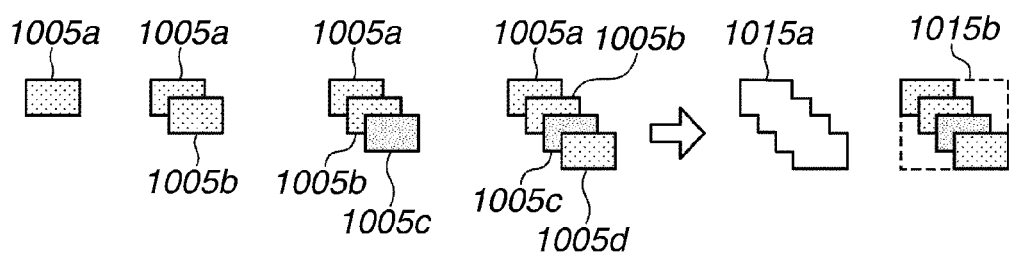

FIG. 8E illustrates an example of image objects with overlapping areas. In FIG. 8E, rectangular graphic objects 1005a, 1005b, 1005c, and 1005d are continuously rendered in order. They have an overlapping area. Such continuously arranged objects can be combined into one image 1015b including all the objects and a path 1015a which indicates an outline of the combined object. The path 1015a is also used when a portion necessary for rendering is cropped from the image 1015b.

In step S702, if the object is an object to be combined (YES in step S702) the processing proceeds to step S703. If the object is not an object to be combined (NO in step S702), the processing proceeds to step S704.

In step S703, the optimization unit 202 performs the object combining processing. Details of the processing will be described below with reference to a flowchart in FIG. 9.

In step S704, the intermediate data generation unit 203 determines whether the optimization unit 202 is executing the object combining processing. If the number of the combined objects is greater than 0, the intermediate data generation unit 203 determines that the combining processing is being executed (see the flowchart in FIG. 9 for details). If the combining processing is being executed (YES in step S704), the processing proceeds to step S705. If the combining processing is not being executed (NO in step S704), the processing proceeds to step S706.

In step S705, the intermediate data generation unit 203 generates intermediate data of the objects combined by the optimization unit 202. Details of the intermediate data generation processing will be described below with reference to the flowchart in FIG. 10.

In step S706, the intermediate data generation unit 203 generates intermediate data of the object not determined as the object to be combined.

In step S707, the analysis unit 201 determines whether the analysis of all the objects of the page currently being analyzed is finished. If the analysis of all the objects is finished (YES in step S707), the processing proceeds to step S708. If the analysis of all the objects is not finished yet (NO in step S707), the processing returns to step S701, and the object analysis is continued.

In step S708, the hardware renderer control unit 204 inputs the intermediate data of one page into the renderer 103 and obtains bitmap image data.

Next, details of the combining processing of objects in step S703 in FIG. 7 will be described with reference to the flowchart in FIG. 9.

In step S801, the optimization unit 202 determines whether the number of the objects which have been combined is greater than 0. If the number is greater than 0 (YES in step S801), the processing proceeds to step S802. If the number is 0 (NO in step S801), the processing proceeds to step S805.

In step S802, the optimization unit 202 determines whether a new object can be combined with the objects which have been combined. If the new object can be combined with the objects (YES in step S802), the processing proceeds to step S808. If the new object cannot be combined with the objects (NO in step S802), the processing proceeds to step S803.

In step S803, the optimization unit 202 generates intermediate data of the objects which have been combined. Details of the intermediate data generation processing will be described below with reference to FIG. 10.

In step S804, the optimization unit 202 resets the number of the objects which have been combined, to 0. In step S805, the optimization unit 202 stores the new object. In step S806, the optimization unit 202 increments the number of the objects which have been combined, by 1. In step S807, the optimization unit 202 temporarily determines the upper limit number of the objects to be combined.

Figure 11:
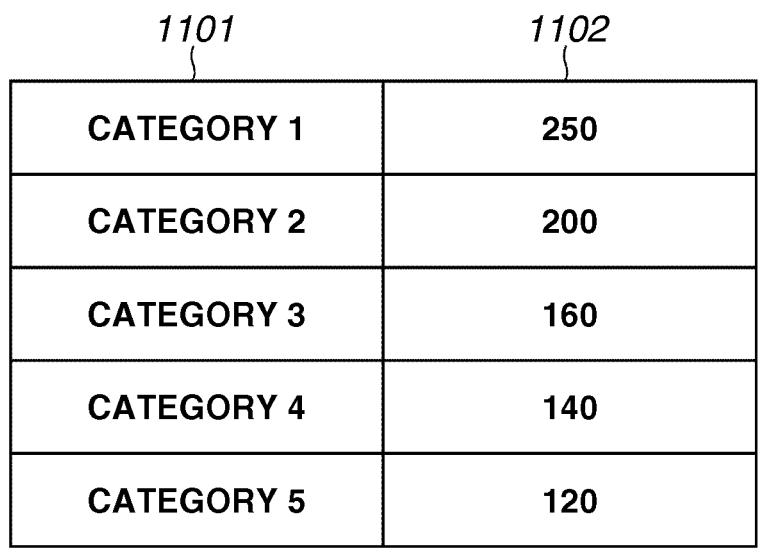
FIG. 11 illustrates a relation between an object type and an upper limit number of the objects to be combined.

FIG. 11 illustrates an example of a table prepared in advance for the optimization unit 202 used for determining the upper limit number. The table includes upper limit numbers 1102 that correspond to categories 1101. The upper limit numbers 1102 are upper limit numbers of the objects to be combined. The categories 1101 are the types of objects to be combined. If the objects include rectangular graphic objects with no overlapping areas, a large upper limit number is set for such objects since the load of the combining processing is low. If the objects include images having an overlapping area, a small upper limit number is set for such objects since the load of the combining processing is high.

According to the present embodiment, category 1 to category 5 in FIG. 11 correspond to the objects illustrated in FIGS. 8A to 8E, respectively. When the processing in step S807 is finished, the processing returns to step S701 in FIG. 7, and the object analysis is continued.

In step S808, the optimization unit 202 determines whether it is necessary to change the upper limit number of the objects to be combined. If the category of the type of the objects to be combined is changed due to the combining of the new object, the optimization unit 202 needs to change the upper limit number of the objects to be combined. If the upper limit number of the objects to be combined needs to be changed (YES in step S808), the processing proceeds to step S809. If the upper limit number of the objects to be combined does not need to be changed (NO in step S808), the processing proceeds to step S810.

In step S809, the optimization unit 202 changes the upper limit number of the objects to be combined. For example, if rectangular graphic objects of the same color but with no overlapping areas have been combined and, further, if a rectangular graphic object of the same color and which overlaps the objects which have been combined is received as a new object, the object type is changed from category 1 to category 2. In this case, the upper limit number of the objects to be combined is changed from 250 to 200.

In step S810, the optimization unit 202 combines the new object and the combined objects into one and stores the acquired result.

In step S811, the optimization unit 202 increments the number of the objects which have been combined, by 1.

In step S812, the optimization unit 202 compares the number of the objects which have been combined, with the upper limit number of the objects to be combined. If the number of the objects which have been combined exceeds the upper limit number (YES in step S812), the processing proceeds to step S813. If the number of the objects which have been combined does not exceed the upper limit number (NO in step S812), the processing returns to step S701 in FIG. 7, and the object analysis is continued.

In step S813, the optimization unit 202 generates intermediate data of the objects which have been combined. Details of the intermediate generation processing will be described below with reference to FIG. 10.

In step S814, the optimization unit 202 resets the number of the objects which have been combined, to 0. When the processing in step S814 is finished, the processing returns to step S701 in FIG. 7 and the object analysis is continued.

Figure 10:
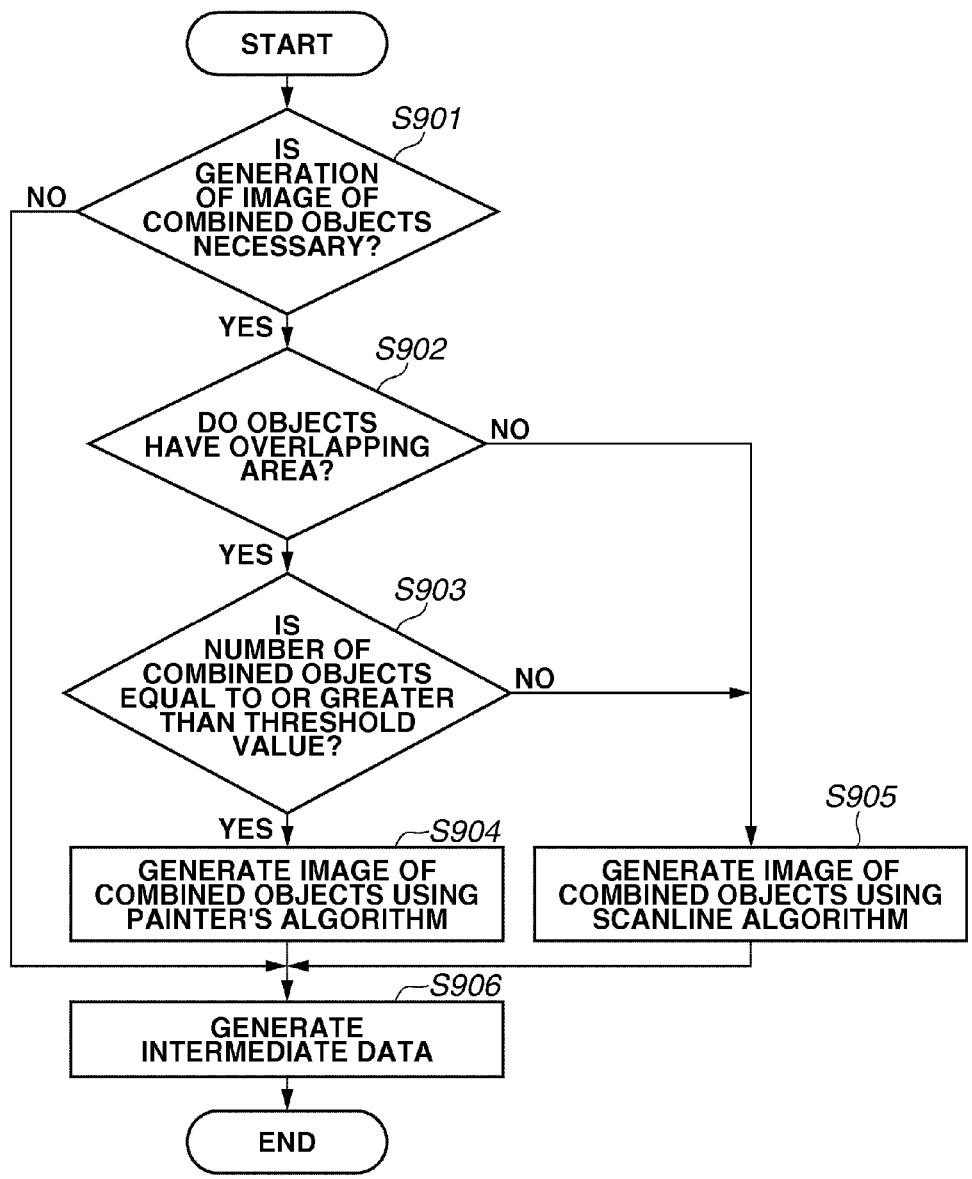
FIG. 10 is a flowchart illustrating generation processing of an image of combined objects.

Next, the intermediate data generation processing of the objects which have been combined will be described with reference to the flowchart in FIG. 10. This intermediate data generation processing is performed in step S703 in FIG. 7 and steps S803 and S813 in FIG. 9.

In step S901, the optimization unit 202 determines whether it is necessary to generate an image of the combined objects. If it is necessary to generate such an image (YES in step S901), the processing proceeds to step S902. If it is not necessary to generate such an image (NO step S901), the processing proceeds to step S906. According to the present embodiment, the object types in FIGS. 8D and 8E require image generation.

In step S902, the optimization unit 202 determines whether an overlapping area of the combined objects exists. If an overlapping area exists (YES in step S902), the processing proceeds to step S903. If an overlapping area does not exist (NO in step S902), the processing proceeds to step S905.

Figure 12:
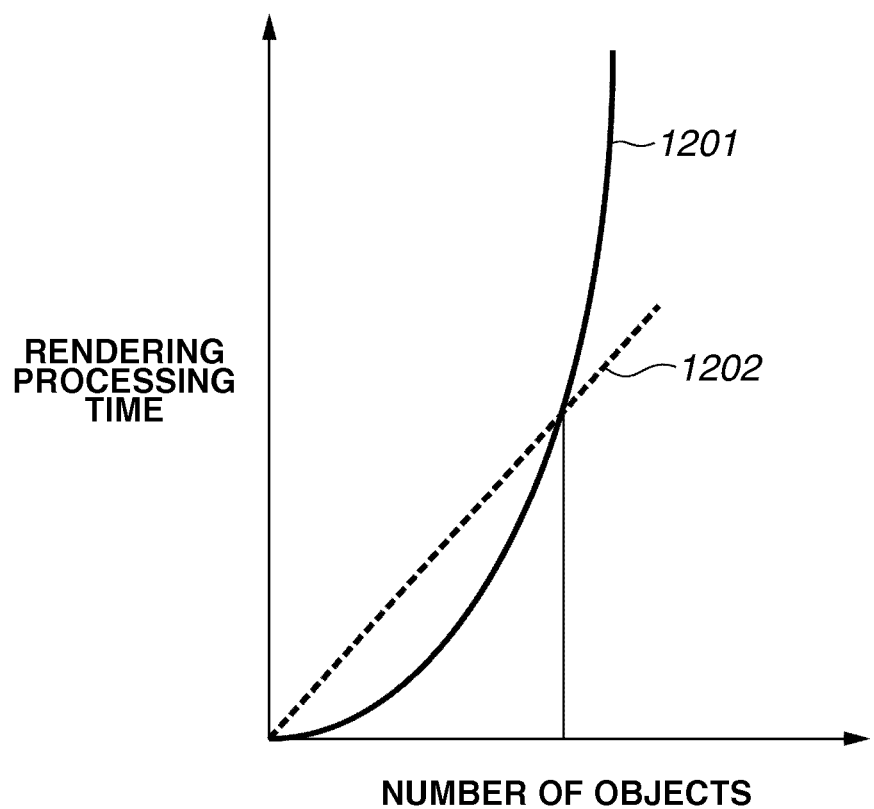
FIG. 12 illustrates a relation between an object number and a rendering processing time.

In step S903, the optimization unit 202 determines whether the number of the objects which have been combined is equal to or greater than a predetermined threshold value. FIG. 12 illustrates a relation between the object number and the processing time when the painter's algorithm renderer 202a or the scanline algorithm renderer 202b included in the optimization unit 202 performs the software rendering of the image objects having an overlapping area. A line 1201 represents the relation when the scan line renderer 202a is used. A line 1202 represents the relation when the painter's algorithm renderer 202b is used.

As described above, according to the scanline algorithm, the rendering is performed based on the information of the edge 302, the level 303, and the fill 304. Accordingly, the scanline algorithm requires complicated processing compared to the painter's algorithm. Thus, when the processing of this complicated scanline algorithm is executed by software, a longer time may be necessary than when the painter's algorithm is used, depending on the number of the objects to be processed. The threshold value mentioned above is to be the number of the objects when the rendering processing time of the scanline algorithm is equal to the rendering processing time of the painter's algorithm.

In step S903, if the number of the objects which have been combined is equal to or greater than the threshold value (YES in step S903), the processing proceeds to step S904. If the number of the objects which have been combined is smaller than the threshold value (NO in step S903), the processing proceeds to step S905.

In step S904, the optimization unit 202 performs the software rendering using the painter's algorithm renderer 202a and generates an image of the combined objects.

In step S905, the optimization unit 202 performs the software rendering using the scanline algorithm renderer 202b and generates an image of the combined objects. In step S906, the optimization unit 202 generates intermediate data of the combined objects.

As described above, by changing the number of the objects to be combined by the optimization unit according to the type of the object, the load of the combining processing of the optimization unit is not significantly increased. Further, when generation of an image is necessary in the combining processing of the optimization unit, the renderer is changed according to the number of the objects which have been combined so that the load of the image generation is not significantly increased.

As a result, bitmap image data can be generated at a high speed from a print job of one page including an enormous number of edges.

Further, the above-described exemplary embodiment can also be achieved by supplying a software program that realizes each function of the aforementioned exemplary embodiment, to a system or an apparatus via a network or various types of storage media, and a computer (or a CPU or a MPU) in the system or the apparatus reads and executes the program stored in such storage media.

According to the exemplary embodiments described above, without increasing the load on the combining processing of the objects, generation processing of the bitmap image data can be performed at a high speed.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-179743 filed Aug. 19, 2011, which is hereby incorporated by reference herein in its entirety.

What is claimed is:

1. An image processing apparatus including at least one processor that executes a program, the image processing apparatus comprising:
an analysis unit configured to analyze a print job;
an optimization unit configured to, based on a result of the analysis performed by the analysis unit, combine a plurality of objects included in the print job into one object according to an upper limit number, wherein the upper limit number of the objects to be combined is different according to a type of the objects;
an intermediate data generation unit configured to generate intermediate data based on the objects combined by the optimization unit; and
an image data generation unit configured to generate image data from the intermediate data generated by the intermediate data generation unit.

2. The image processing apparatus according to claim 1, wherein the optimization unit includes a plurality of image data generation units, and
wherein if generation of image data is necessary when the objects are combined, the image data generation unit is changed according to the type of the objects.

3. The image processing apparatus according to claim 2, wherein the plurality of image data generation units include an image data generation unit configured to generate the image data using a painter's algorithm and an image data generation unit configured to generate the image data using a scanline algorithm.

4. The image processing apparatus according to claim 3, wherein if a number of the plurality of objects which have been combined is equal to or greater than a threshold value, the optimization unit generates the image data of the plurality of objects using the painter's algorithm, and if the number of the plurality of objects which have been combined is smaller than the threshold value, the optimization unit generates the image data of the plurality of objects using the scanline algorithm.

5. The image processing apparatus according to claim 1, wherein the type of the objects combined by the optimization unit is a rectangular graphic object of a same color which does not generate an overlapping area when combined, a rectangular graphic object of a same color which generates an overlapping area when combined, or a graphic object with an arbitrary shape of a same color.

6. The image processing apparatus according to claim 1, wherein the type of the objects combined by the optimization unit is an image object which does not generate an overlapping area when combined or an image object which generates an overlapping area when combined.

7. An image processing method for an image processing apparatus including at least one processor that executes a program, the image processing method comprising:
analyzing a print job;
combining a plurality of objects included in the print job into one object according to an upper limit number;
generating intermediate data based on the combined objects, wherein an upper limit number of the objects to be combined is different according to a type of the objects, and
generating image data from the generated intermediate data.

8. A computer-readable storage medium storing a program for causing a computer to execute an image processing method, the image processing method comprising:
analyzing a print job;

combining a plurality of objects included in the print job into one object according to an upper limit number, wherein an upper limit number of the objects to be combined is different according to a type of the objects;

generating intermediate data based on the combined objects, and generating image data from the generated intermediate data.

9. A printing apparatus including at least one processor that executes a program, the printing apparatus comprising:

an analysis unit configured to analyze a print job;

an optimization unit configured to, based on a result of the analysis performed by the analysis unit, combine a plurality of objects included in the print job into one object according to an upper limit number, wherein the upper limit number of the objects to be combined is different according to a type of the objects;

an intermediate data generation unit configured to generate intermediate data based on the objects combined by the optimization unit;

an image data generation unit configured to generate image data from the intermediate data generated by the intermediate data generation unit, and a printing unit configured to print an image based on the image data generated by the image data generation unit.

* * * * *